United States Patent [19]

Brandt et al.

[11] 4,089,700
[45] May 16, 1978

[54] PROCESS FOR THE PREPARATION OF OPAQUE ORGANIC PIGMENTS

[75] Inventors: Horst Brandt, Odenthal; Reinhold Hornle, Cologne; Karlheinz Wolf; Hans-Heinz Molls, both of Leverkusen, all of Germany

[73] Assignee: Bayer Aktiengesellschaft, Leverkusen, Germany

[21] Appl. No.: 684,649

[22] Filed: May 10, 1976

[30] Foreign Application Priority Data

May 13, 1975 Germany .............................. 2521249

[51] Int. Cl.² ............................................... C08J 3/00
[52] U.S. Cl. .................................. 106/309; 106/288 Q
[58] Field of Search ............................ 106/309, 388 Q

[56] References Cited

U.S. PATENT DOCUMENTS

| 2,268,144 | 12/1941 | Vesce | 106/309 |
| 3,119,706 | 1/1964 | Bachman | 106/309 |
| 3,671,281 | 6/1972 | Doss | 106/309 |

Primary Examiner—Winston A. Douglas
Assistant Examiner—J. V. Howard
Attorney, Agent, or Firm—Plumley and Tyner

[57] ABSTRACT

Organic pigments which provide an opaque color impression in binders and exhibit adequate flow properties in binders are obtained from pigments which provide a transparent color impression in binders in a simple way in that an azeotrope-forming agent which is appropriate for the liquid adhering to the pigment is added to the moist pigment obtained after the preparation, and the azeotropic mixture and any excess solvent which may be present are then distilled off.

6 Claims, No Drawings

PROCESS FOR THE PREPARATION OF OPAQUE ORGANIC PIGMENTS

Organic pigments, such as copper phthalocyanine, quinacridones, dioxanes and, in particular, azo pigments, are obtained, after preparation and conditioning, in so far as conditioning is required, mainly in a form in which they provide transparent colour impressions in binders. If their pigment concentrations are increased in order to obtain full shade colorations, the binders to which the pigments are added exhibit flow properties which are impaired to an undesirable degree.

However, for a number of applications there is a demand for opaque pigments, which, in the binder, must exhibit the flow properties demanded. In recent times this need has been met to an ever increasing extent by organic pigments and, preferably organic pigments which are already known for transparent colorations and which are converted by means of appropriate after-treatments with a change in the particle size into opaque pigments are used.

German Auslegeschrift (German Published Specification) 2,302,509 describes a process in which a pigment obtained after coupling is thoroughly stirred with alkali, filtered off, washed until neutral, optionally dried, and heated with an organic solvent, which is immiscible with water or which is not miscible with water in all proportions, to temperatures above 100° C, the organic solvent is distilled off with steam and the pigment is filtered out of the residual aqueous suspension and dried. A further process in which the abovementioned processing steps are also employed, with the exception of the thorough stirring with alkali, is known from German Auslegeschrift (German Published Specification) 2,302,482.

According to these processes, known organic pigments, which provide a transparent colour impression in binders, are converted into opaque pigments.

It has now been found that the same result can be achieved, without a loss in quality of the pigment properties, by means of a surprisingly simpler process. The process according to the invention is characterised in that an azeotrope-forming agent appropriate for the liquid adhering to the pigment or the liquid contained in the pigment press cake is added to the moist pigment obtained after preparation, preferably to the moist pigment press cake obtained by filtration after preparation, and the azeotropic mixture and any excess solvent (azeotrope-forming agent) which may be present are then distilled off.

Processes used hitherto for the azeotropic dehydration of pigment press cakes, such as are described, for example, in British Patent Specification 318,937 and in U.S. Pat. Spec. Nos. 2,138,049 and 2,268,144, give no indication of a possible change in the particle size and thus a change in the covering power. Rather, it is emphasised in the patent specifications mentioned that the particles, the particle size and the covering power remain unchanged.

German Auslegeschrift (German Published Specification) 1,266,721 describes a process in which a dispersion of the pigment in an organic solvent is prepared by azeotropic distillation from an aqueous pigment press cake, the solvent taking up impurities from the pigment, so that the quality of the pigment is improved, and finally being separated, together with the dissolved impurities, from the pigment, by filtration.

German Auslegeschrift (German Published Specification) 1,115,711 describes a process in which a water-containing paste of perylene-tetracarboxylic acid diimide, which exhibits no pigment properties whatsoever, is converted into a pigment form by treatment with organic solvents.

On the basis of this state of the art it must be regarded as extremely surprising that the desired result is obtained with the process claimed.

Organic pigments of the azo, anthraquinone, azaporphine, thioindigo or polycyclic series as well as the quinacridone, dioxazine, naphthalenetetracarboxylic acid or perylenetetracarboxylic acid series and also copper phthalocyanines can be used as pigments which provide a transparent colour impression in binders. A large number of individual pigments of these categories of substances are known, for example from Colour Index, 2nd edition.

The solvents, which are to be distilled off as an azeotrope by means of the process according to the invention, are determined by the processes for the preparation and conditioning of the particular pigment and are known to those skilled in the art. Azeotrope-forming agents suitable for these solvents are known, for example from Handbook of Chemistry and Physics, 52, 1971 to 1972. Examples of azeotrope-forming agents which may be mentioned are benzene, toluene, xylenes, butanols, propionitrile, hexan-4-one, butyl acetate and 1-butoxy-2-propanol, and these are used preferentially.

Preferably, the process according to the invention is used for azo pigments, if these are obtained as aqueous press cakes. In this case, azeotrope-forming agents which have a boiling point of preferably below 100° C and an azeotropic point with water of below 100° C are used.

The process is appropriately carried out that the 10 to 60 percent strength by weight, preferably 15 to 30 percent strength by weight, pigment press cake is mixed with the azeotrope-forming agent in a weight ratio 1 to (0.8 to 10) in a suitable unit and the azeotropic mixture, and, if appropriate, the excess solvent, are then distilled off. Suitable units are, for example, paddle driers, thin layer contact driers or similar equipment. The individual process steps or the entire process can be carried out under normal pressure or in vacuo. The azeotrope-forming agent can be recovered from the distillate by customary processes and recycled for renewed use.

The dry pigment powders obtained by the process according to the invention give opaque colorations and improved fastness to light compared with that of the transparent pigments, and display good flow properties in binders, in concentrations which give full shade colorations. Losses in depth of colour were not observed. The pigments prepared in this way are used in lacquers, printing inks and plastics, in particular in conjunction with inorganic pigments.

EXAMPLE 1

80 g of a water-moist pigment press cake of the pigment of the structure (I) are mixed with 200 g of propionitrile (boiling point 97.2° C) and the mixture is heated in a thin layer evaporator until the azeotropic temperature (82.2° C) is reached and a water-containing mixture distills off,

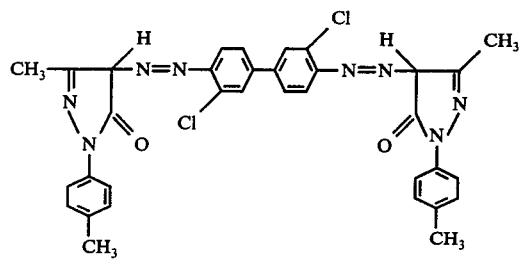
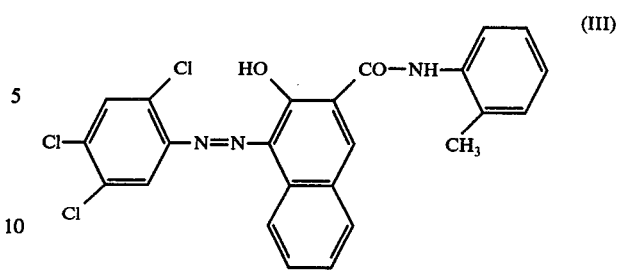

The excess propionitrile is then stripped off, initially at a somewhat higher temperature and then in vacuo, until the pigment is dry. Compared with the product dried in the customary manner, the pigment displays increased covering power for an equal depth of colour and improved fastness to light and gloss formation.

In place of a thin layer evaporator it is also possible to use a paddle drier, a thin layer contact drier or the like.

EXAMPLE 2

60 g of a water-moist press cake of the pigment of the structure (II) and 400 g of benzene (boiling point 80.1° C) are heated in a thin layer evaporator until the azeotropic temperature (69.4° C) is reached and a water-containing mixture distills off.

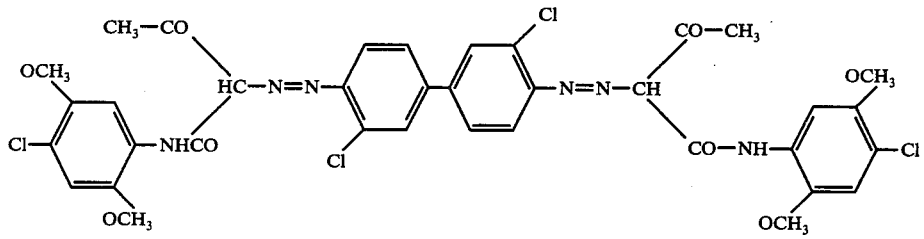

The excess benzene is then stripped off at about the same temperature and then in vacuo until the pigment is dry. Compared with the product dried in the customary manner, the pigment displays increased covering power for an equal depth of colour and a substantially improved fastness to light and gloss formation. The flow properties of the corresponding full shade lacquers are also improved.

EXAMPLE 3

200 g of a press cake of the pigment of the structure (III) are mixed with 500 g of propionitrile (97.2° C) and the mixture is heated in a thin layer evaporator until the azeotropic temperature (82.2° C) is reached and a water-containing mixture distills off.

The excess propionitrile is then stripped off, initially at a somewhat higher temperature and then in vacuo, until the pigment is dry. Compared with the product dried in the customary manner, the pigment displays substantially increased covering power for about equal depth of colour as well as improved fastness to light and gloss formation.

We claim:

1. In a process for converting a transparent pigment which provides a transparent color impression in binders into an opaque pigment which provides an opaque color impression in binders the improvement consisting essentially of adding to the prepared transparent pigment while moist a solvent comprising an azeotrope-forming agent capable of forming an azeotropic mixture with the liquid associated with the transparent pigment, distilling off said mixture at the azeotropic point thereof, stripping any excess solvent from the resultant product, and drying said product, whereby an opaque pigment in the form of a dry pigment powder which exhibits adequate flow properties in binders is obtained.

2. The process of claim 1, wherein said solvent is added to the moist transparent pigment press cake obtained by filtration of said transparent pigment after preparation thereof in the proportion of [0.8 to 10]to 1 by weight of solvent to pigment press cake.

3. The process of claim 2, wherein said pigment press cake is from 10 to 60% strength by weight.

4. The process of claim 2, wherein said press cake is an aqueous azo pigment press cake and the azeotropic-forming agent has an azeotropic-forming agent has an azeotropic point with water of below 100° C.

5. The process of claim 4, wherein the boiling point of the azeotropic-forming agent is below 100° C.

6. The process of claim 1, wherein the azeotropic-forming agent is benzene, toluene, xylene, butanol, propionitrile, hexan-4-one, butyl acetate or 1-butanol-2-propanol.

* * * * *